(12) United States Patent
Faruquie et al.

(10) Patent No.: US 11,176,468 B2
(45) Date of Patent: *Nov. 16, 2021

(54) COMPUTER-BASED SYSTEMS CONFIGURED FOR ENTITY RESOLUTION AND INDEXING OF ENTITY ACTIVITY

(71) Applicant: Capital One Services, LLC, McLean, VA (US)

(72) Inventors: Tanveer Faruquie, McLean, VA (US); Aman Jain, McLean, VA (US); Jihan Wei, McLean, VA (US); Amir Reza Rahmani, McLean, VA (US); Christopher Johnson, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/888,148

(22) Filed: May 29, 2020

(65) Prior Publication Data
US 2021/0142191 A1  May 13, 2021

Related U.S. Application Data

(63) Continuation of application No. 16/678,680, filed on Nov. 8, 2019, now Pat. No. 10,713,577.

(51) Int. Cl.
*G06N 5/04* (2006.01)
*G06N 5/00* (2006.01)
(Continued)

(52) U.S. Cl.
CPC ............ *G06N 5/04* (2013.01); *G06F 16/2379* (2019.01); *G06N 3/08* (2013.01); *G06N 5/003* (2013.01);
(Continued)

(58) Field of Classification Search
CPC .......... G06N 5/003; G06N 5/02; G06N 5/022; G06N 5/025; G06N 5/04; G06N 20/00;
(Continued)

(56) References Cited

U.S. PATENT DOCUMENTS

| 2017/0243131 A1* | 8/2017 | Kephart | G06F 16/00 |
| 2018/0268015 A1 | 9/2018 | Sugaberry | |

(Continued)

*Primary Examiner* — Shane D Woolwine
(74) *Attorney, Agent, or Firm* — Greenberg Traurig, LLP

(57) ABSTRACT

In order to facilitate the entity resolution and entity activity tracking and indexing, systems and methods include receiving first source records from a first database and second source records from a record database. A candidate set of second source records is determined by a heuristic search in the set of second source records. A candidate pair feature vector associated with each candidate pair of first and second source records is generated. An entity matching machine learning model predicts matching first source records for each candidate second source record based on the respective candidate pair feature vector. An aggregate quantity associated with the matching first source records is aggregated from a quantity associated with each first source record, and a quantity index for each candidate second source record is determined based the aggregate quantities. Each quantity index is displayed to a user.

20 Claims, 8 Drawing Sheets

(51) Int. Cl.
*G06N 20/00* (2019.01)
*G06F 16/23* (2019.01)
*G06N 3/08* (2006.01)
*G06N 5/02* (2006.01)
*G06N 3/04* (2006.01)
*G06N 20/10* (2019.01)
*G06N 7/00* (2006.01)
*G06N 20/20* (2019.01)

(52) U.S. Cl.
CPC ............... *G06N 5/02* (2013.01); *G06N 5/022* (2013.01); *G06N 20/00* (2019.01); *G06N 3/0454* (2013.01); *G06N 5/025* (2013.01); *G06N 7/005* (2013.01); *G06N 20/10* (2019.01); *G06N 20/20* (2019.01)

(58) Field of Classification Search
CPC .......... G06N 20/10; G06N 20/20; G06N 3/08; G06N 3/0454; G06N 7/005; G06F 16/2379
See application file for complete search history.

(56) References Cited

U.S. PATENT DOCUMENTS

2019/0364154 A1   11/2019   Hermanek et al.
2019/0385240 A1*  12/2019   Lee ........................ G06N 20/00

\* cited by examiner

COMPUTER-BASED SYSTEMS CONFIGURED FOR ENTITY RESOLUTION AND INDEXING OF ENTITY ACTIVITY

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for one or more novel technological applications of entity resolution and indexing of entity activity.

BACKGROUND OF TECHNOLOGY

A computer system may include a group of computers (e.g., clients, servers, smart routers) and other computing hardware devices that are linked together through one or more communication channels to facilitate communication and/or resource-sharing, via one or more specifically programmed graphical user interfaces (GUIs), among a wide range of users.

In some cases, one or more of the computing hardware devices collects information pertaining to an entity associated with the system that is not explicitly linked to the entity. Moreover, the collected activities may relate to activities, but in an unorganized and unintelligible fashion. Evaluating entity activities would often require a large resource cost with difficult to understand results.

SUMMARY OF DESCRIBED SUBJECT MATTER

In some embodiments, the present disclosure provides an exemplary computer-based method that includes at least the following steps of receiving, by at least one processor, a plurality of first data items associated with a plurality of first source records in a first source database associated with a first entity from which a plurality of first source records originated, where each first data item of the plurality of first data items includes: i) a quantity data item representing a quantity associated with a respective first data item, ii) a date data item representing a date associated with the respective first data item, and iii) a second entity data item identifying a second entity associated with the respective first data item. The at least one processor receives a set of a plurality of second data items from at least one second entity record database, where each second data item of the plurality of second data items in the set include a respective second entity record identifier data item representing a respective second entity record identifier associated with a respective second entity record. The at least one processor determines a candidate set of candidate second data items of the plurality of second data items that potentially match each respective first data item of the plurality of data items by performing a heuristic search for candidate second data items in the set of second data items from the at least one second entity record database. The at least one processor generates a respective candidate pair for each respective first data item of the plurality of data items, wherein each respective candidate pair comprises: i) the respective first data item, and ii) a respective candidate second data item of the candidate set of candidate second data items associated with the respective first data item. The at least one processor generates a respective candidate pair feature vector associated with each respective candidate pair for each respective first data item of the plurality of data items. The at least one processor utilizes an entity matching machine learning model to predict at least one matching first data item of the plurality of first data items to a respective candidate second data item in the candidate set of second data items based at least in part on the respective candidate pair feature vector. The at least one processor determines an aggregate quantity associated with the at least one matching first data item based at least on an aggregation of each respective quantity data item representing each respective quantity associated with each respective first data item of the at least one matching first data item. The at least one processor determines a quantity index for each respective second entity record associated with each respective candidate second data item based at least in part on a respective aggregate quantity of an aggregate of each respective quantity data item associated with each respective first data item of the at least one matching first data item. And, the at least one processor causes to display the quantity index associated with a selected second entity record on a screen of at least one computing device associated with at least one user responsive to a selection by the at least one user of a selected second data item in the set of second data items.

In some embodiments, the present disclosure provides an exemplary computer-based method that includes at least the following steps of receiving, by at least one processor, a batch of a plurality of first data items associated with a plurality of first entity records in an account database associated with a first entity from which a plurality of first source records originated, where each first data item of the batch of the plurality of first data items includes: i) a quantity data item representing a quantity associated with a respective first data item, ii) a date data item representing a date associated with the respective first data item, and iii) a second entity data item representing a second entity associated with the respective first data item, and where the batch includes the plurality of first data items generated within a predetermined time period. The at least one processor determines a candidate set of candidate second data items of the plurality of second data items that potentially match each respective first data item of the plurality of data items by performing a heuristic search for candidate second data items in the set of second data items from the at least one second entity record database, wherein the candidate set of second data items results from a heuristic search for candidate second data items in a set of second data items from at least one second entity record database, i) a plurality of respective second data items associated with a plurality of respective second entity records, and ii) a plurality of respective second entity record identifier data items representing a plurality of respective second entity record identifiers associated with the plurality of respective second entity records. The at least one processor generates a respective candidate pair for each respective first data item of the plurality of data items; wherein each respective candidate pair comprises: i) the respective first data item, and ii) a respective candidate second data item of the candidate set of candidate second data items associated with the respective first data item. The at least one processor generates a respective candidate pair feature vector associated with each respective candidate pair for each respective first data item of the plurality of data items. The at least one processor utilizes an entity matching machine learning model to predict at least one matching first data item of the plurality of first data items to a respective candidate second data item in the candidate set of second data items based at least in part on the respective candidate pair feature vector. The at least one processor determines an aggregate quantity associated with the at least one matching first data item based at least on an aggregation of each respective quantity data item representing each respective quantity associated with each respective first data item of the at least one matching first data item. The at least one processor determines a quantity index for each respective second entity record associated with each respective candidate second data item based at least in part on a respective aggregate quantity of an aggregate of each respective quantity data item associated with each respective first data item of the at least one matching first data item. And, the at least one processor causes to display the quantity index associated with a selected second entity record on a screen of at least one computing device associated with at least one user responsive to a selection by the at least one user of a selected second data item in the set of second data items.

In some embodiments, the present disclosure provides an exemplary technically improved computer-based system that includes at least the following components of an account database configured to store a plurality of first data items associated with a plurality of accounts, and at least one processor configured to perform instructions. The instructions include: receive a plurality of first data items associated with a plurality of first entity records in an account database associated with a first entity from which a plurality of first source records originated, where each first data item of the plurality of first data items includes: i) a quantity data item representing a quantity associated with a respective first data item, ii) a date data item representing a date associated with the respective first data item, and iii) a second entity data item representing a second entity associated with the respective first data item; receive a set of a plurality of second data items from at least one second entity record database, where each second data item of the plurality of second data items in the set include a respective second entity record identifier data item representing a respective second entity record identifier associated with a respective second entity record; determine a candidate set of candidate second data items of the plurality of second data items that potentially match each respective first data item of the plurality of data items by performing a heuristic search for candidate second data items in the set of second data items from the at least one second entity record database; generate a respective candidate pair for each respective first data item of the plurality of data items; wherein each respective candidate pair comprises: i) the respective first data item, and ii) a respective candidate second data item of the candidate set of candidate second data items associated with the respective first data item; generate a respective candidate pair feature vector associated with each respective candidate pair for each respective first data item of the plurality of data items; utilize an entity matching machine learning model to predict at least one matching first data item of the plurality of first data items to a respective candidate second data item in the candidate set of second data items based at least in part on the respective candidate pair feature vector; determine an aggregate quantity associated with the at least one matching first data item based at least on an aggregation of each respective quantity data item representing each respective quantity associated with each respective first data item of the at least one matching first data item; determine quantity index for each respective second entity record associated with each respective candidate second data item based at least in part on a respective aggregate quantity of an aggregate of each respective quantity data item associated with each respective first data item of the at least one matching first data item; and cause to display the quantity index associated with a selected second entity record on a screen of at least one computing device associated with at least one user responsive to a selection by the at least one user of a selected second data item in the set of second data items.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
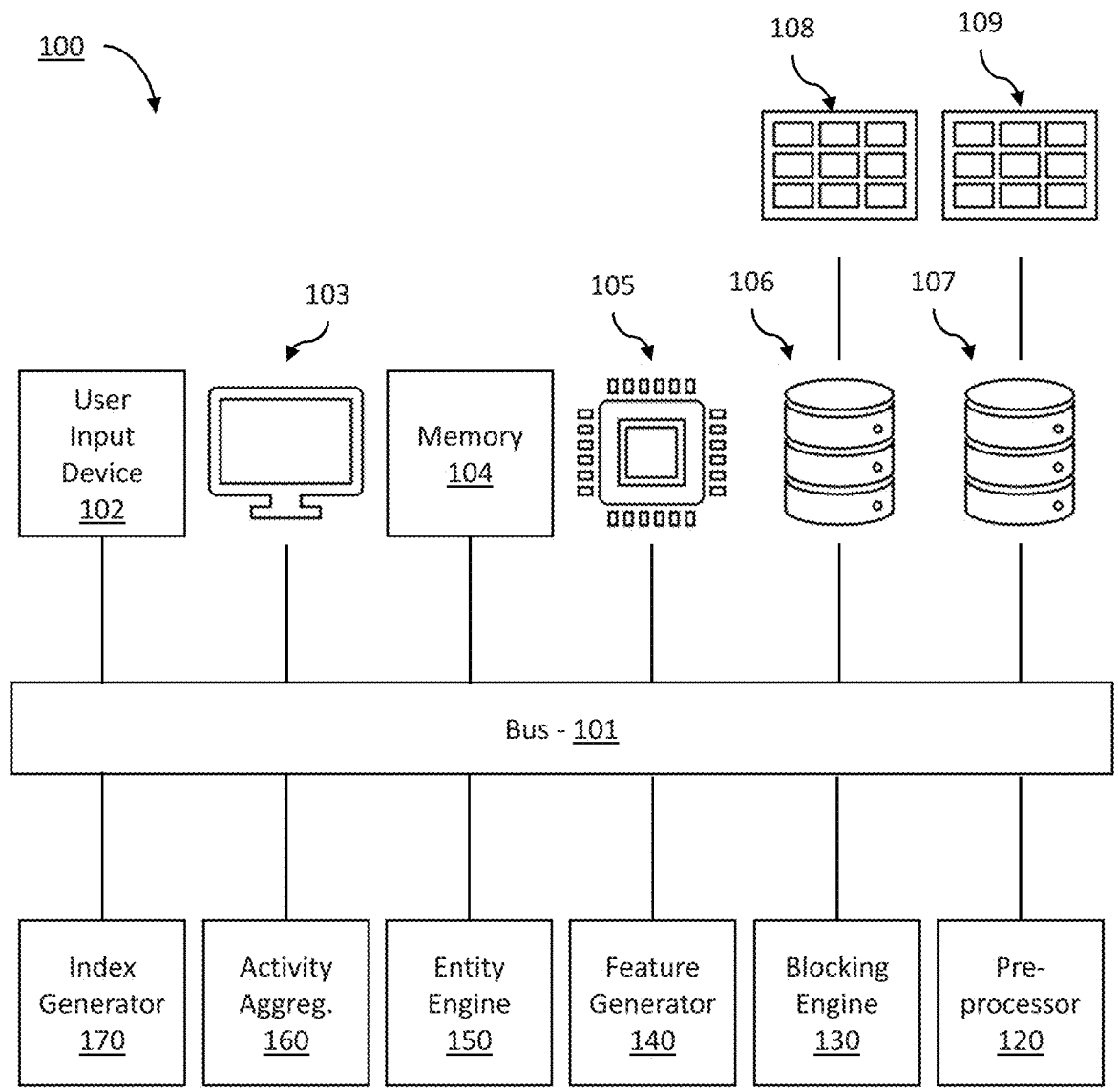
FIGS. 1-8 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIGS. 1 through 8 illustrate systems and methods of database communication, data collection and processing, data visualization, index generation. The following embodiments provide technical solutions and/or technical improvements that overcome technical problems, drawbacks and/or deficiencies in the technical fields involving database inefficiencies, database interoperability, data accuracy and data portability, among others. As explained in more detail, below, technical solutions and/or technical improvements herein include aspects of improved machine learning, entity resolution, database interoperability, service interoperability, among others. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of another exemplary computer-based system for entity resolution and activity aggregation and indexing in accordance with one or more embodiments of the present disclosure.

In some embodiments, an exemplary inventive entity evaluation system 100 includes a computing system having multiple components interconnect through, e.g., a communication bus 101. In some embodiments, the communication bus 101 may be a physical interface for interconnecting the various components, however in some embodiments, the communication bus 101 may be a network interface, router, switch, or other communication interface. The entity evaluation system 100 may receive a first set of records 108 and second set of records 109, and the various components may interoperate to matching data items from each set of records and generate an evaluation and characterization of each entity included in the first and/or second set of records 108 and 109. In some embodiments, the evaluation and characterization may include determining a value for each record associated with an entity and aggregating the total value for each entity to generate an activity index to characterize each entity.

In some embodiments, the entity evaluation system 100 may include a processor 105, such as, e.g., a complex instruction set (CISC) processor such as an x86 compatible processor, or a reduced instruction set (RISC) processor such as an ARM, RISC-V or other instruction set compatible processor, or any other suitable processor including graphical processors, field programmable gate arrays (FPGA), neural processors, etc..

In some embodiments, the processor 105 may be configured to perform instructions provide via the bus 101 by, e.g., accessing data stored in a memory 104 via the communication bus 101. In some embodiments, the memory 104 may include a non-volatile storage device, such as, e.g., a magnetic disk hard drive, a solid state drive, flash memory, or other non-volatile memory and combinations thereof, a volatile memory such as, e.g., random access memory (RAM) including dynamic RAM and/or static RAM, among other volatile memory devices and combinations thereof. In some embodiments, the memory 104 may store data resulting from processing operations, a cache or buffer of data to be used for processing operations, operation logs, error logs, security reports, among other data related to the operation of the entity evaluation system 100.

In some embodiments, a user or administrator may interact with the entity evaluation system 100 via a display 103 and a user input device 102. In some embodiments, the user input device 102 may include, e.g., a mouse, a keyboard, a touch panel of the display 103, motion tracking and/or detecting, a microphone, a imaging device such as a digital camera, among other input devices. Results and statuses related to the entity evaluation system 110 and operation thereof may be displayed to the user via the display 103.

In some embodiments, a first source database 106 may communicate with the entity evaluation system 100 via, e.g., the communication bus 101 to provide the first source records 108. In some embodiments, the first source records 108 may include records having data items associated with first entities, such as, e.g., commercial entities, including merchants, industrial entities, firms and businesses, as well as individuals, governmental organizations, or other entities. For example, the first entities may be consumers and the data items may include, e.g., consumer transactions with merchants selling, e.g., products, services, etc.. In some embodiments, the data items may include, e.g., transaction information related to purchases made by the entity, such as, e.g., a consumer purchase from a merchant. In some embodiments, the first source records 108 are collected from, e.g., a consumer transaction database forming the first source database 106. In some embodiments, the consumer transaction database may include, e.g., a credit card account database recording credit card transactions as records of activity, or other bank account databases and financial account databases, and combinations thereof. Thus, in some embodiments, the first records 108 may include data items for each record, including, e.g., a date, a quantity of the transaction, and a merchant or other payee or payment destination associated with the transaction.

In some embodiments, a second source database 107 may communicate with the entity evaluation system 100 to provide second source records 109 via, e.g., the communication bus 101. In some embodiments, the second source records 109 may include entity records identifying entities, such as, e.g., commercial entities, including merchants, industrial entities, firms and businesses, as well as individuals, governmental organizations, or other entities that are the same or different from the first entities. In some embodiments, the second source records 109 include records of, e.g., each merchant in a geographic area, each merchant in a catalogue or database of business partners or business customers, or other database of merchants and associated records. For example, the second source database 107 may provide second source records 109 for all second entities in, e.g., a particular town, a particular city, a particular state, a particular region, a particular country, or other geographic area. In some embodiments, the second source database 107 may provide second source records 109 for all second entities transacting with a selected product type, a particular service, having a particular size, or any other subset. In some embodiments, the second source database 107 may provide second source records 109 for all known second entities, or for all known second entities satisfying a user configured categorization. In some embodiments, each record of the second source records 109 may provide information related to the set of merchants, such as, e.g., data items related to identifiers of the second entities, location, or other second entity related information.

In some embodiments, the entity evaluation system 100 may use the first source records 108 and the second source records 109 to evaluate each entity identified in the second source records 109. Accordingly, in some embodiments, a set of components communicate with the communication bus 101 to provide resources for, e.g., matching first source records 108 with second source records 109, establishing activities attributable to each entity, and generating an index to evaluate each entity.

In some embodiments, a pre-processor 120 receives the first source records 108 and the second source records 109. In some embodiments, the pre-processor 120 may include, e.g., a memory having instructions stored thereon, as well as, e.g., a buffer to load data and instructions for processing, a communication interface, a controller, among other hardware. A combination of software and/or hardware may then be implemented by the pre-processor 120 in conjunction with the processor 105 or a processor dedicated to the pre-processor 120 to implement the instructions stored in the memory of the pre-processor 120.

In some embodiments, the first source records 108 and the second source records 109 include raw data from the collection of entity activities. As such, the data items from the first source records 108 and the second source records 109 may include, e.g., a variety of data formats, a variety of data types, unstructured data, duplicate data, among other data variances. Thus, to facilitate processing and using the data for consistent and accurate results, the data may be pre-processed to remove inconsistencies, anomalies and variances. Thus, in some embodiments, the pre-processor 120 may ingest, aggregate, and/or cleanse, among other pre-processing steps and combinations thereof, the data items from each of the first source records 108 and the second source records 109.

Using the pre-processor 120, the first source records 108 may be compiled into a single structure, such as, e.g., a single file, a single table, a single list, or other data container having consistent data item types. For example, each first source record may be added to, e.g., a table with data items identified for each of, e.g., a date, a first entity, a second entity, a quantity, among other fields. The format of each field may be consistent across all records after pre-processing by the pre-processor 120 such that each record has a predictable representation of the data recorded therein.

Similarly, using the pre-processor 120, the second source records 109 may be compiled into a single structure, such as, e.g., a single file, a single table, a single list, or other data container having consistent data item types. For example, each second source record may be added to, e.g., a table with data items identified for each of, e.g., a second entity, among other fields. The format of each field may be consistent across all records after pre-processing by the pre-processor 120 such that each record has a predictable representation of the data recorded therein.

In some embodiments, the structures containing each of the pre-processed first source records and the pre-processed second source records may be stored in, e.g., a database or a storage, such as, e.g., the memory 104, or a local storage of the pre-processor 120.

In some embodiments, a blocking engine 130 receives the pre-processed first source records 108 and the pre-processed second source records 109. In some embodiments, the blocking engine 130 may include, e.g., a memory having instructions stored thereon, as well as, e.g., a buffer to load data and instructions for processing, a communication interface, a controller, among other hardware. A combination of software and/or hardware may then be implemented by the blocking engine 130 in conjunction with the processor 105 or a processor dedicated to the blocking engine 130 to implement the instructions stored in the memory of the blocking engine 130.

In some embodiments, the first source records 108 include activities and the second source records 109 include entities that may be related to the activities. Matching the activities to the associated entities may be a processor intensive and resource intensive process. However, in some embodiments, to reduce the use of resources, the blocking engine 130 may perform an initial rough estimate of candidate entity matches for the activities, estimating which activities are associated with which entity.

In some embodiments, to perform the initial estimate, the blocking engine 130 may utilize, e.g., a heuristic search to match records in the pre-processed first source records 108 to a second source record of the pre-processed second source records 109. In some embodiments, the heuristic search may compare each first source record to each second source record to compare, e.g., a second entity data item of the first record to a second entity record identifier data item representing a second entity record identifier of each second source record and determines potential matches based on the distance of pairs of values representing the data items. Other or additionally data items of each of the first and second source records 108 and 109 may be incorporated in the blocking to determine potential matches. As a result, a, e.g., table of each first record in a row with a set of potentially matching second source records may be produced. Other formats of presenting the potential matches are also contemplates, such as, e.g., a table having a column with the row including each second source record with a row of each potentially matching first source record, a separate file for each first source record including data from each potentially matching second source record, a separate file for each second source record including data from each potentially matching first source record, a table having a column with a row for each second source record with a sub-row of the row including each potentially matching first source record, a table having a column with a row for each first source record with a sub-row of the row including each potentially matching second source record, among other possible formats of presenting the blocked first source records 108 and/or blocked second source records 109. Herein, the term "block" or "blocked" or "blocking" refers to a block of records or data items associated with a given record to associate multiple potential matches of data of a first type with a particular data of a second type.

In some embodiments, the table or other representation of matching records may be stored in, e.g., a database or a storage, such as, e.g., the memory 104, or a local storage of the blocking engine 130.

In some embodiments, a feature generator 140 receives the first source records 108 and the blocked second source records 109. In some embodiments, the feature generator 140 may include, e.g., a memory having instructions stored thereon, as well as, e.g., a buffer to load data and instructions for processing, a communication interface, a controller, among other hardware. A combination of software and/or hardware may then be implemented by the feature generator 140 in conjunction with the processor 105 or a processor dedicated to the feature generator 140 to implement the instructions stored in the memory of the feature generator 140.

In some embodiments, to facilitate matching records, the feature generator 140 generate or extract features representative of characteristics of each record. The features may, therefore, characterize quantitatively the data entity representing an entity identified within the respective records (e.g., a user, merchant, organization, or other entity). In some embodiments, the features quantify the characteristics such that similarities between records may be quantified based on the similarity of the features. In some embodiments, the features are handcrafted to be tailored for use with the type of records included in each of the first source records 108 and the second source records 109, such as, e.g., transaction and merchant records, respectively. In some embodiments, the features include semantic features, such as, e.g., names, descriptions, location descriptions, among other semantic features. In some embodiments, the features may include quantitative features, such as, e.g., dates, location measurements, phone numbers, among others.

In some embodiments, a table or other representation of features of potentially matching records may be generated to correlate first data entity features with the associated first source records and second data entity features with the associated second source records to quantify each entity represented therein. In some embodiments, the table may then be stored in, e.g., a database or a storage, such as, e.g., the memory 104, or a local storage of the feature generator 140.

In some embodiments, an entity engine 150 receives the first data entity feature vectors and the second data entity feature vectors. In some embodiments, the entity engine 150 may include, e.g., a memory having instructions stored thereon, as well as, e.g., a buffer to load data and instructions for processing, a communication interface, a controller, among other hardware. A combination of software and/or hardware may then be implemented by the entity engine 150 in conjunction with the processor 105 or a processor dedicated to the entity engine 150 to implement the instructions stored in the memory of the entity engine 150.

In some embodiments, the entity engine 150 may utilize the first data entity feature vectors and the second data entity feature vectors to resolve entity matches. For example, using the blocked first source records and blocked second source records described above, the entity engine 150 may compare the first data entity feature vectors of the first source records in a block to the second data entity feature vectors of the second source records in the same block. Thus, the entity engine 150 may determine probable matches from the set of candidate matches.

In some embodiments, the entity engine 150 utilizes a machine learning model to compare the first data entity feature vectors with each candidate matching second data entity feature to generate a probability of a match. Thus, in some embodiments, the entity engine 150 utilizes, e.g., a classifier to classify entities and matches based on a probability. In some embodiments, the classifier may include, e.g., random forest, gradient boosted machines, neural networks including convolutional neural network (CNN), among others and combinations thereof. Indeed, in some embodiments, a gradient boosted machine of an ensemble of trees is utilized. Such models may capture a non-linear relationship between transactions and merchants, thus providing accurate predictions of matches. In some embodiments, the classifier may be configured to classify a match where the probability of a match exceeds a probability of, e.g., 90%, 95%, 97%, 99% or other suitable probability based on the respective data entity feature vectors.

In some embodiments, each first source record 108 matching to a second source record 109 may be represented in, e.g., a table, list, or other entity resolution data structure. For example, the entity engine 150 may produce a table having a column for the second source records 109 with each second source record 109 being listed in a row. The table may include one or more additional columns to list the matching first source records 108 in row with each second source record 109. In some embodiments, where the first source records 108 are transactions and the second source records 109 are merchants, the table may have a merchant column, with each merchant listed in the column in its own row. The transactions that match a given merchant may be appended to the given merchant's row in, e.g., an additional column for each transaction, or listed within a single column in the given merchant's row.

In some embodiments, an activity aggregator 160 receives the first source records 108 matched to each of the matching second source records 109 as represented in, e.g., the entity resolution data structure. In some embodiments, the activity aggregator 160 may include, e.g., a memory having instructions stored thereon, as well as, e.g., a buffer to load data and instructions for processing, a communication interface, a controller, among other hardware. A combination of software and/or hardware may then be implemented by the activity aggregator 160 in conjunction with the processor 105 or a processor dedicated to the activity aggregator 160 to implement the instructions stored in the memory of activity aggregator 160.

In some embodiments, each first source record 108 may include a quantity, such as, e.g., a dollar amount, a tally, a frequency, a duration, or other quantity represented by a quantity data item. In some embodiments, the activity aggregator 160 sums the quantities represented by the matching first source records 108 for each second source record 109.

Thus, in some embodiments, the activity aggregator 160 aggregates the quantities resulting from entity activity for each entity of the second source records 109. For example, in some embodiments, the second source records 109 include merchants, and the matching first source records 108 include transactions associated with a merchant, including a dollar amount paid to or received from the matching merchant. In such a scenario, the activity aggregator 160 may sum the dollar amounts of all transactions associated with a merchant to determine an aggregate dollar amount associated with merchant activity. Thus, the activity aggregator 160 may determine an aggregate quantity associated with activities of each entity of the second source records 109.

In some embodiments, an index generator 170 receives the aggregates for each second source record 109. In some embodiments, the index generator 170 may include, e.g., a memory having instructions stored thereon, as well as, e.g., a buffer to load data and instructions for processing, a communication interface, a controller, among other hardware. A combination of software and/or hardware may then be implemented by the index generator 170 in conjunction with the processor 105 or a processor dedicated to the index generator 170 to implement the instructions stored in the memory of the index generator 170.

In some embodiments, the index generator 170 utilizes the aggregate quantities to generate a quantity index that represents an evaluation of the activity of each entity. For example, each entity can be compared to other known entities with known activities and activity quantities to determine a ranking, a risk level, or other measure of health of activity quantities. For example, wherein the second source records 109 include merchants, the quantity index may represent a revenue or health of revenue for the merchant based on aggregate transaction quantities, by, e.g., comparison with other similar businesses.

In some embodiments, the index generator 170 may be updates in a temporally dynamic fashion, e.g., daily, weekly, monthly or by another period based on, e.g., user selection via the user input device 102. Thus, the first and/or second source records 108 and 109 may be updated with new records on a periodic basis or in real-time, and the entity evaluation system 100 may match the records and aggregate activities as described above according to the selected period. In some embodiments, the quantity index may be updated each period based on the total set of records, however in some embodiments, each period results in a new quantity index representative of that period. In some embodiments, the new or updated quantity index for each period may be logged and/or records in, e.g., the memory 104 for historical tracking of entity activities. Thus, trends and risks associated with each entity may be determined through time.

In some embodiments, the index generator 170 may further employ the quantity index to make recommendations concerning each entity. For example, in some embodiments, where the entities are merchants, the index generator 170 may generate marketing recommendations for financial products in direct mailing marketing, such as, e.g., lines of credit, loans, mortgages, investment, etc. For example, the index generator 170 may compare an entity's quantity index with financial products to, e.g., target active businesses based on a threshold level of activity, identify product fit over time and/or relative to other businesses based on the amount of business conducted, and identify unsuitable businesses based on activity being below a threshold level according to the quantity index. Thus, each respective second entity record may be categorized based on each respective associated quantity index according to a set of predetermined quantity index ranges based on multiple threshold levels of activity. The categorizations may then be used to match each respective second entity associated with each respective second entity record to a product of a plurality of products assigned to each set of predetermined quantity index ranges.

Similarly, in some embodiments, the quantity index can be used for improved field agent marketing and with new and existing customers. For example, in some embodiments, second entities can be ranked according to each respective quantity index determined for each respective second entity record. In some embodiments, this ranking is performed for all second entity records to determine a highest ranked set of second entities that may be appropriate customers for a given product or set of products or other business communication. However, in some embodiments, the ranking is performed for a set of second entities that are already customers of products, and thus are targeted entities for upgrades of products and services. The highest ranking targeted entities may be identified and selected for, e.g., product upgrades or other business communications.

In some embodiments, underwriting can be facilitated using the quantity index from the index generator 170. For example, in some embodiments, a quantity index of a customer from the second entity records may be approved or disapproved based on, e.g., a threshold quantity index assigned to a product or service for which the customer is applying.

Similarly, in some embodiments, customer management recommendations may be made by the index generator 170. For example, wherein the entities are merchants, the index generator 170 may utilize the quantity index to, e.g., offer products and terms to existing customers, offer upgrade opportunities where aggregate activity has shown consistent increases, identify business segments for each merchant based on activity amounts to customize marketing strategies and increase engagement with the financial products, among other customer management recommendations. In some embodiments, the offers may be determined by categorizing each respective second entity record of a set of second entity records into a respective customer category based on each respective quantity index associated with each respective second entity record of the set of second entity records. Each quantity index range can be one of a set of predetermined quantity index ranges that relate to a set of products identified as appropriate for that quantity index. Using the categorizations, modifications to products associated with each entity may be suggested to the respective entity to better match a customer to a product as the customer's business grows or recedes.

Figure 2:
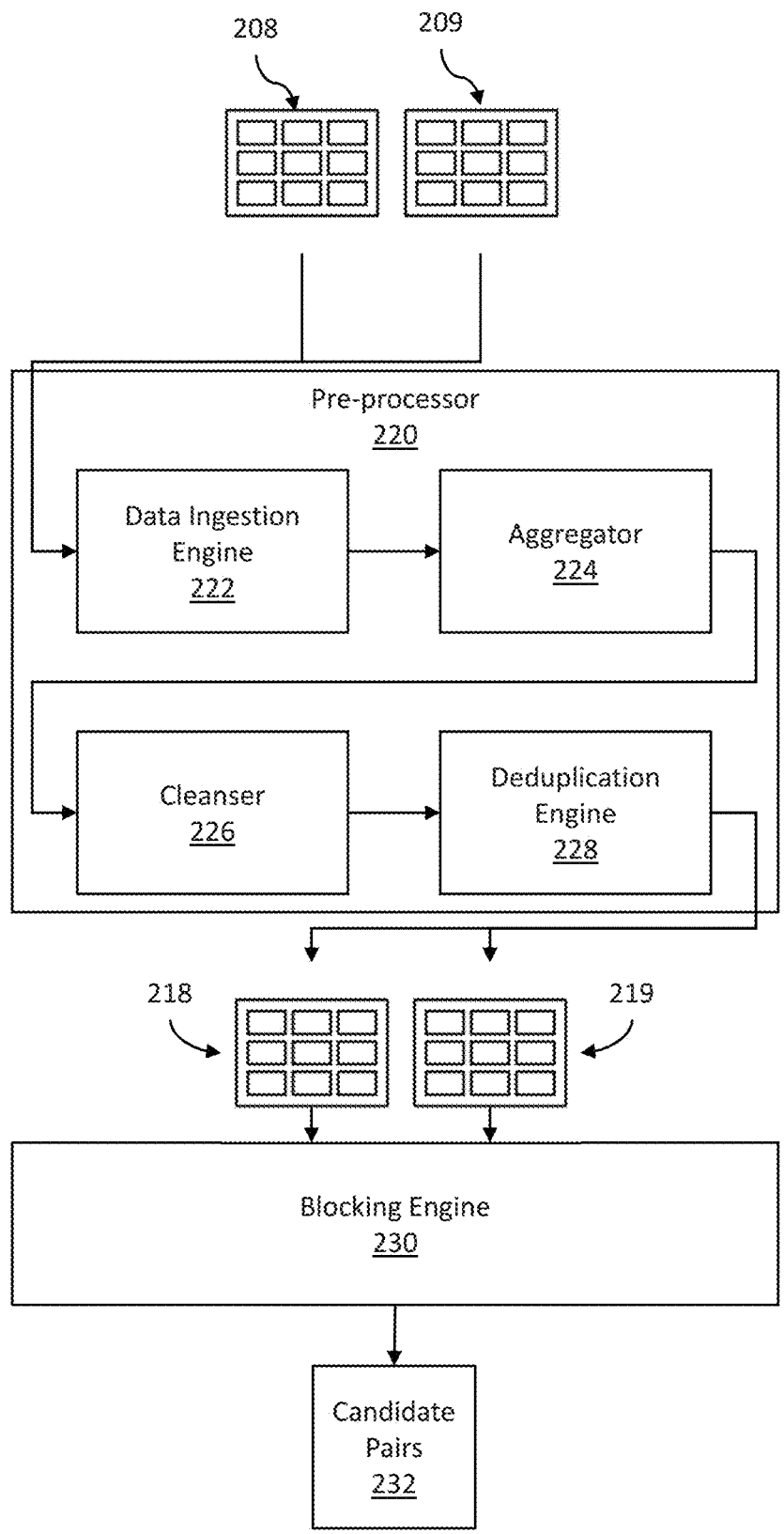

FIG. 2 is a block diagram of an exemplary pre-processor and blocking engine of another exemplary computer-based system for entity resolution and activity aggregation and indexing in accordance with one or more embodiments of the present disclosure.

In some embodiments, an entity evaluation system for entity resolution and activity aggregation and indexing, such as, e.g., the entity evaluation system 100 above, may include the pre-processor 120 and the blocking engine 130 described above, such as, e.g., a pre-processor 220 and a blocking engine 230. In some embodiments, first source records 208 and second source records 209 are provide to the pre-processor 220 for ingestion, aggregation, cleansing and deduplication.

In some embodiments, a data ingestion engine 222 of the pre-processor 220 receives the first source records 208 including entity activities, and the second source records 209 including entity information. In some embodiments, the data ingestion engine 222 receives the raw data from a database, such as, e.g., a local database, a remote database, a cloud storage, or other data store. In some embodiments, the raw data may include, e.g., character strings, images, text files, or other unstructured data. Thus, in some embodiments, the data ingestion engine 220 parses the raw data to identify data items and form structured data including, e.g., quantity data items representing quantities associated with a record, date data item representing dates associated with each records, entity data items representing entities associated with each data item, location data items representing a location of each entity, among other data items. For example, the data ingestion engine 220 may employ a combination of character recognition to identify alphanumeric characters, and semantic segmentation to identify information represented by the characters, including, e.g., neural networks and other classifiers for semantic segmentation. However, in some embodiments, the data ingestion engine 220 employs delimiter-based parsing and/or fixed-length parsing to parse data items from the raw data.

In some embodiments, the structured data may be provided to an aggregator 224. In some embodiments, the aggregator 224 generates raw identifiers for each record, or for each record of the first source records 208. In some embodiments, the raw identifiers may correspond to each data item identified by the data ingestion engine 222, such as, e.g., quantity, date, entity name, location (e.g., city, zip code, state, country, county, region, etc.), merchant category code, among other identifiers. In some embodiments, the raw identifiers may used to aggregate records of the first source records 208 and aggregate records of the second source records 209 to organize the records according to common raw identifiers.

In some embodiments, upon aggregating the records, a cleanser 226 may cleanse the records. In some embodiments, the cleanser 226 utilize rule-based detection to, e.g., detect that records associated with known entities are captured correctly. Additionally, the cleanser 226 removes anomalous and unnecessary information to provide a uniform format of the data of each record.

For example, in some embodiments, where the entities are merchants identified in the second source records 209 and the first source records 208 are transactions from, e.g., consumer credit accounts, consumer banking accounts, partner transaction processing companies, among others, the cleanser 226 may ensure that all transactions and all merchants are correctly represented in a predetermined format. For example, the prefixes and suffixed may be identified and separated, five digit zip codes may be extracted, phone numbers and uniform resource locators (URLs) may be extracted, city may be determine by extracting the city or determining the city from the zip codes, the merchant name may be cleansed by, e.g., removing special characters, applying the merchant category code (MCC) to determine name, as well as generate flags to indicate merchant partnerships with external parties. For example, restaurants may use payment partners that may appear in transaction records under the payment partner name, such as, e.g., LevelUp™ GrubHub™, Seamless™, Uber Eats™, among others. Such payment partner transactions may be identified and flagged.

In some embodiments, the cleansed data may be provided to a deduplication engine 228 to remove any duplicate information. In some embodiments, the deduplication engine 228 may generate a table with columns for, e.g., the cleansed name, cleansed zip code, cleansed city, state, MCC, country, or other fields and combinations thereof to construct a row for each cleansed record. The columns of each row may be used to generate a cleansed identifier (ID) by, e.g., forming a character string of the data of each column. Records may then be aggregated by, e.g., summing associated quantities, increasing a count number, or other aggregation technique, to combine duplicated cleansed IDs and reduce the number of records. In some embodiments, the second source records 209 are a set of known merchants, while the first source records 208 are transactions. The first source records 208 may, therefore, undergo the pre-processing processing to conform to the representation of entities in the second source records 209 and deduplicate the transactions. In such an example, the second source records 209 may not need to be pre-processed as the second source records 209 include a curated list of merchants entered according to a predefined format.

In some embodiments, the pre-processor 220 generates two tables: a cleansed first source record table 218 having aggregated first source records based on the cleansed and deduplicated first source records 208; and a cleansed second source record table 219 having aggregated and deduplicated second source records 209 such as, e.g., entities, for example merchants. In some embodiments, the cleansed first source record table 218 includes daily aggregated transaction amounts corresponding to each cleansed ID. In some embodiments, a cleansed first source record table 218 is generated based on new first source records 208 on a periodic basis, such as, e.g., daily, weekly, monthly, etc. to form a periodic activity table 218. In some embodiments, the cleansed second source record table 219 includes aggregated and deduplicated merchant information without any transaction data where, e.g., every row in this table corresponds to a unique cleansed ID to form an entity table 219.

In some embodiments, the blocking engine 230 may receive the periodic activity table 218 and the entity table 219 to, e.g., generate candidate matching sets of entities in the entity table 219 to activities in the periodic activity table 218. In some embodiments, the blocking engine 230 compares each row in the entity table 219 to all activities in the periodic activity table 218 using a heuristic search. Using the heuristic search based on each entity in the entity table 219, potentially matching activities in the periodic activity table 218 may be determined. For example, the heuristic search may search the periodic activity table 218 using, e.g., the zip code and name of each entity in the entity table 219. In some embodiments, the heuristic search compares the entity information to the activities by determining a distance between a value representative of the entity information and a value representative of the activity based on, e.g., the zip code and the name (e.g., a location data item and name data item). Where an activity from the periodic activity table 218 and an entity from the entity table 219 reach a minimum distance relative to each other activity compared to the entity based on the heuristic search, a potential match is determined. For example, in some embodiments, an activity-entity pair is created for each combination of an activity from the periodic activity table 218 and an entity from the entity table 219, and matches are determined by a distance of any given activity-entity pair being greater than a matching threshold, such as, e.g., a predetermined threshold or user-configurable threshold.

In some embodiments, the blocking engine 230 may generate candidate sets of activity data for each entity. For example, in some embodiments, a table is produced where each row contains two major sets of columns. One set corresponds to the information related to the entity identified in the activity data and another set corresponds to information related to the corresponding entity in the entity table 219. In other words, each row consists of a pair of a unique activity and a corresponding candidate entity and all their related columns for form candidate pairs 232.

Figure 3:
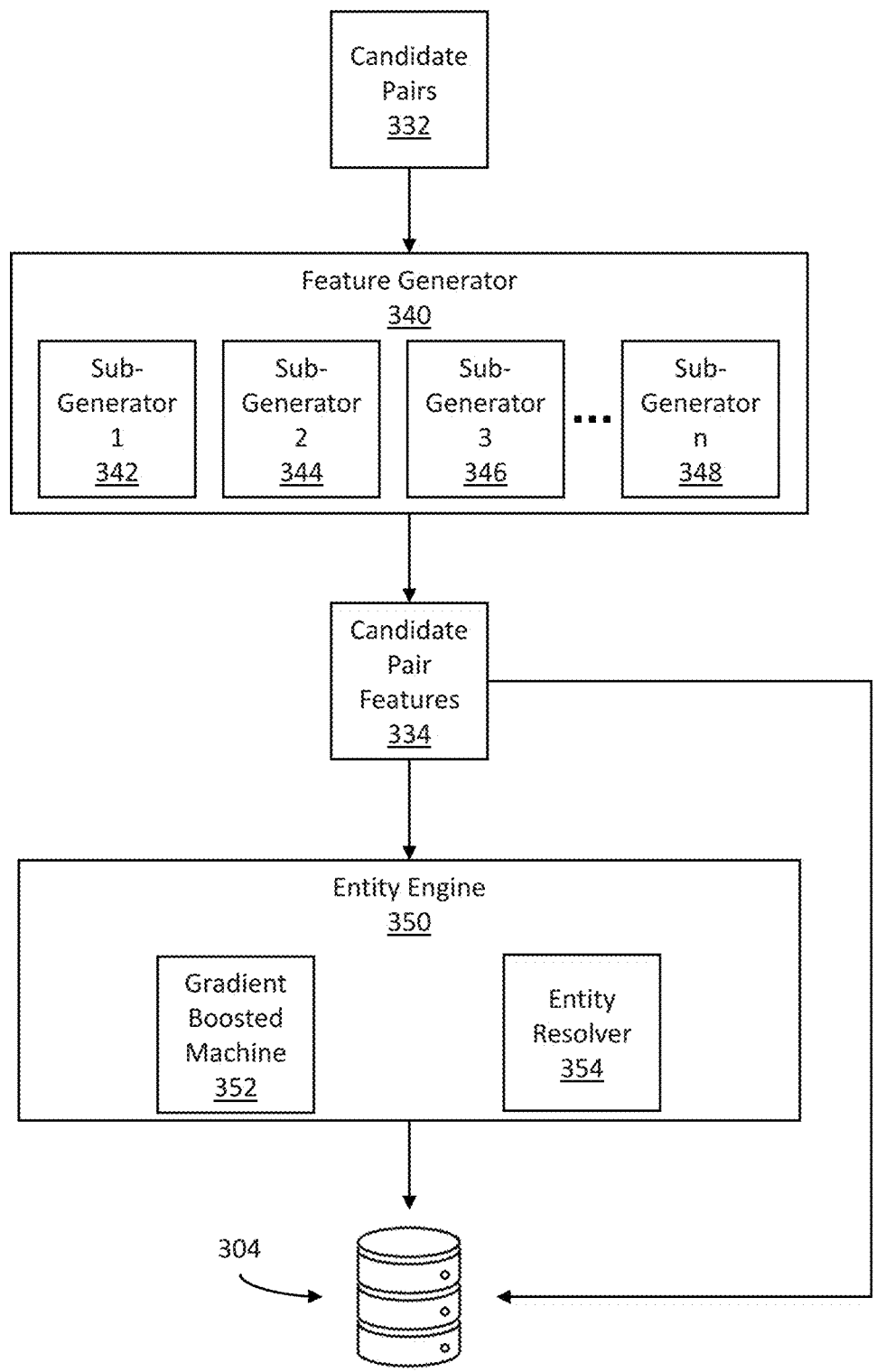

FIG. 3 is a block diagram of an exemplary feature generator and entity engine of another exemplary computer-based system for entity resolution and activity aggregation and indexing in accordance with one or more embodiments of the present disclosure.

In some embodiments, a feature generator 340 receives the candidate pairs 332 to generate quantitative features characterizing each pair so that an entity engine 334 may determine an existence of a match from each candidate pair 332. In some embodiments, the feature generator 340 compares each activity in the candidate pair to an associated entity of the candidate pair to determine a quantitative representation of a similarity between, e.g., an entity data item represented in by the activity and the data items of the candidate entity. For example, the feature generator 340 may compare the entity names in each of the activity and the entity of each candidate pair 332, a location of each of the activity and the entity of each candidate pair 332, among data items and combinations thereof.

In some embodiments, the feature generator 340 includes multiple sub-generators 342 through 348. Each of the sub-generators 342 through 348 may generate a feature vector representative of a different type of comparison of the activity and entity of the pair. For example, sub-generator 1 342 may determine a distance, such as Jaccard distance between the activity and the entity, sub-generator 2 344 may determine an n-gram similarity, sub-generator 3, 346 may determine a Jaro-Winkler distance, with additional generators through sub-generator n 348. In some embodiments, the feature generator 340 may have sub-generators 342 through 348 to generate one or more features for each candidate pair 332, examples of which are as follows:

In some embodiments, one or more of the sub-generators 342 through 348 generates a feature vector using, e.g., 2,3,4 character n-gram similarity between, e.g., a cleansed activity name and the candidate entity name.

In some embodiments, one or more of the sub-generators 342 through 348 generates a feature vector using, e.g., 2,3,4 character n-gram similarity between the cleansed activity name and the candidate entity name with spaces removed. This feature is based on the observation that sometimes the entity name in an activity, such as, e.g., a transaction, appears with spaces removed due to the limited space in the transaction terminal. For example, the true business name may be, "Gem Stone King" as represented in the second source records, but it appears as "gemstoneking" in activity data of the first source records.

In some embodiments, one or more of the sub-generators 342 through 348 generates a feature vector using, e.g., 2,3,4 character n-gram similarity between the cleansed activity name and the candidate entity name with vowels removed. This feature is based on the observation that sometimes an entity name in activity data, such as, e.g., a transaction, appears with vowels removed due to the limited space in the transaction terminal. For example, the true entity name represented in the second source records may be "Montclair's Salon" but it appears as "mntclr sln" in the activity data of the first source records.

In some embodiments, one or more of the sub-generators 342 through 348 generates a feature vector using, e.g., character 3-gram similarity between a place-stripped cleansed activity name and a place-stripped candidate entity name. This feature is based on the observation that sometimes an entity name contains location information, such as a city name, town name, state name, country, or other location information, that may be misleading for matching purposes. For example, let's assume that we have two different businesses, one is named "Manhattan Pizza" and another one is named "Manhattan Cafe". Although they are different businesses, the n-gram similarity between the name is very high because they both contain the word Manhattan which is a long word compared to the other words. Therefore, the word "Manhattan" may be removed from both business names and the feature sub-generator 342 through 348 computes the character n-gram similarity between "Pizza" and "Cafe" for this feature.

In some embodiments, each sub-generator 342 through 348 utilizes, e.g., Jaccard similarity to determine, e.g., the n-gram similarity of the sub-generators 342 through 348 described above. In some embodiment, the Jaccard similarity coefficient between the activity data n-gram sets and the entity data n-gram sets is calculated as the size of the intersection of the two sets divided by the size of their union. This gives results in a continuous feature in the range [0, 1].

However, in some embodiments, one or more of the sub-generators 342 through 348 utilizes a different similarity measure, such as, e.g., Levenshtein distance between, e.g., the cleansed activity name and the candidate entity name.

In some embodiments, one or more of the sub-generators 342 through 348 generates a feature vector using, e.g., Jaro distance between the cleansed activity name and the candidate entity name. The Jaro similarity accounts for strings that contain matching characters that appear in different sequence order that are not far from each other. This feature facilitates a fuzzy match between the name strings.

In some embodiments, one or more of the sub-generators 342 through 348 generates a feature vector using, e.g., Jaro-Winkler distance between the cleansed activity name and the candidate entity name. Jaron-Winkler gives more favorable ratings to strings that match from the beginning. This feature is inspired based on the observation that there are a lot of truncations in the activity data. For example, the candidate entity name may be "Poteau Valley Veterinary Hospital" but appears as "Poteau Valley Veterina" in the cleanses activity data.

In some embodiments, one or more of the sub-generators 342 through 348 generates a feature vector using, e.g., Best Token Score (bts): This feature is designed to measure if the entity name, e.g., the entity data item in the cleansed activity data and in the candidate entity data have rare words in common. In order to identify the rare tokens, a corpus is maintained in the associated one of the sub-generators 342-348 by randomly selecting 70,000 business names from the entity data items (entity name) identified in the cleansed activity data, and a business name in DnB, Everstring, and Infogroup, respectively. The associated one of the sub-generators 342-348 may then extract the unique tokens from this corpus and the corresponding count of each unique token and save it in a dictionary, such as, e.g., a Python dictionary or a dictionary associated with any other suitable programming language, including, e.g., R, Java, C++ or other language. To calculate bts, the associated one of the sub-generators 342-348 may first remove the tokens that appear in, e.g., the address or city fields from both the entity name, e.g., the entity data item in the cleansed activity data and the candidate entity name. The associated one of the sub-generators 342-348 may then identify the common tokens between the stripped entity names in activity data and candidate entity data, and look up the corresponding counts of the common tokens in the dictionary that was built in the previous step. The score for each token is the inverse of the count for each unique token. The bts is computed as the maximum score of the common tokens. If any of the common tokens are not found in the dictionary, it is assigned a score of one. This means that if a common token is so unique that it did not appear in the corpus, it is assigned the highest score, which, in some embodiments, is one.

In some embodiments, one or more of the sub-generators 342 through 348 generates a feature vector using, e.g., Longest Common Subsequence: This feature is a measurement of the longest in-order string common to both the cleansed activity name and the candidate entity name. The subsequences may be continuous or non-continuous: for example, "Bloomfield Pizza" and "Bloom Pizza" share a common subsequence of length 11. This common subsequence length may then be normalized by the maximum length of either of the cleansed activity name or the candidate entity name, thus providing a feature in the range [0,1].

In some embodiments, one or more of the sub-generators 342 through 348 generates a feature vector using, e.g., term frequency-inverse document frequency (TF-IDF) similarity between names. The TF-IDF between the cleansed activity name and the candidate entity name are calculated based on the corpus that was generated during the calculation of bts. The TF-IDF similarity computed here provides another method to quantify whether the names share rare tokens across the cleansed activity name and the candidate entity name.

In some embodiments, one or more of the sub-generators 342 through 348 generates a feature vector using, e.g., Contains Place. This is a Boolean feature describing whether or not the cleansed the activity name and the candidate entity name share any place tokens.

In some embodiments, one or more of the sub-generators 342 through 348 generates a feature vector using, e.g., Sequence match score. This measure finds the longest contiguous matching subsequence that contains no "junk" elements. In some embodiments, "junk" are things for which a feature vector is unnecessary, such as portions that are not useful for matching. The same idea is then applied recursively to the pieces of the sequences to the left and to the right of the matching subsequence.

In some embodiments, one or more of the sub-generators 342 through 348 generates a feature vector using, e.g., TF-IDF similarity between, e.g., a MCC record in the cleansed activity data, and, e.g., industry descriptions in the candidate entity data. In some embodiments, the associated one of the sub-generators 342 through 348 trains a TF-IDF model based on a corpus of categories. The corpus may be based on predefined dictionaries stored, e.g., in the associated one of the sub-generators 342 through 348, that contain the correspondence between the category codes and category descriptions. The associated one of the sub-generators 342 through 348 then calculates the cosine similarity between the TF-IDF vectors corresponding to the transaction category and the business category, respectively.

In some embodiments, one or more of the sub-generators 342 through 348 generates a feature vector using, e.g., Semantic similarity between Merchant Category Code (MCC) and industry descriptions. This feature is designed to quantify the similarity in, e.g., the line of business of the activity data and the candidate entity. For example, for one pair, the activity category (indicated by the MCC) is "Legal Services and Attorneys" and the description for the corresponding candidate entity is "Office of Lawyers". Although there is no common word between these two category descriptions, they are semantically similar. The semantic category similarity may assign a score of, e.g., 0.9 to this pair. To compute this feature, a weighted average of the word embeddings is employed. For example, in some embodiments, Global Vector word embeddings with weights calculated using the TF-IDF model trained for the previous feature may be employed. The IDF weights for every token may then be utilized to perform a weighted average of the word embeddings that appear in the category descriptions in each pair, both for the activity and the candidate entity. A cosine similarity may then be computed between the weighted average of the categories of the activity and the candidate entity, respectively.

In some embodiments, one or more of the sub-generators 342 through 348 generates a feature vector using, e.g., Hamming distance between phone numbers: Hamming distance between two strings of equal length is the number of positions at which the corresponding symbols are different. In this case, the associated sub-generator 342 through 348 may measure the distance between the phone number of activities, such as, e.g., transactions that contain a phone number, and the phone number in the candidate entity such as a merchant.

In some embodiments, one or more of the sub-generators 342 through 348 generates a feature vector using, e.g., Hamming distance between, e.g., zip codes. This feature is designed to measure the similarity between five-digit zip codes In some embodiments, one or more of the sub-generators 342 through 348 generates a feature vector using, e.g., Partner_flag. In some embodiments, the Partner_flag is a Boolean flag indicating that the entity identified in the cleansed activity data is a partner with another company for that particular activity. In some embodiments, the Partner_flag may be established using a combination of activity prefixes, suffixes, city, zip, phone numbers and URLs (for those with phone and URL under the city column) to compute this flag.

In some embodiments, one or more of the sub-generators 342 through 348 generates a feature vector using, e.g., Phone_flag. In some embodiments, the Phone_flag is a Boolean flag indicating whether the activity city in the raw data is a phone number.

In some embodiments, one or more of the sub-generators 342 through 348 generates a feature vector using, e.g., URL_flag. In some embodiments, the URL_flag is a Boolean flag indicating whether the activity city in the raw data is a URL.

In some embodiments, one or more of the sub-generators 342 through 348 generates a feature vector using, e.g., Null indicators for semantic category similarity, TF-IDF category similarity, and hamming distance between phone numbers. This is a Boolean flag that indicates whether any of these features is null for each row.

Other measures of feature vectors form the candidate pairs 332 are also contemplated. Using the features from the sub-generators 342 through 348, the feature generator 340 may construct a feature vector for each pair in the candidate pairs 332 to produce candidate pair features. Each feature may be individually appended to an associated pair in the candidate pairs 332, or the features may be combined into a feature vector, which may then be appended to the associated pair in the candidate pairs 332. In some embodiments, the candidate pairs 332 and candidate pair features 334 may be stored in, e.g., a database or memory 304, such as, e.g., the memory 104 of the exemplary entity evaluation system 100 described above.

In some embodiments, an entity engine 350, such as the entity engine 150 described above, may receive the candidate pair features 334. In some embodiments, the entity engine 350 uses the candidate pair features 334 to determine a probability of a match between an activity and an entity in the associated candidate pair 332 based on a score predicted for the features. In some embodiments, the entity engine 350 employs an entity matching machine learning model, such as, e.g., a gradient boosted machine 352 to score a candidate pair 332 based on the candidate pair features 334, and an entity resolver 354 to resolve the activity and the entity of predicted matches based on the score.

In some embodiments, the gradient boosted machine 352 receives the candidate pair features 334 as an input pair, with the output being a probability of a match for the pair. In some embodiments, the gradient boosted machine 352 may then use a series of classifier decision trees to evaluate a similarity between the entity data items of the activity and the candidate entity of each candidate pair using the associated features to produce the probability of a match.

In some embodiments, the gradient boosted machine 352 determines the scores using hyper-parameters in, e.g., an Xgboost algorithm tuned via training with known, ground-truth input-output pairs of activities and entities. For example, in some embodiments, hyper-parameter tuning is performed using cross-validation and grid search. In some embodiments, the tuning parameters may include, e.g., Max_depth, Min_child_weight, Reg_lambda, among others. In some embodiments, Max_depth includes a maximum depth of a tree. Increasing this value may make the model more complex and more likely to overfit. In some embodiments, tuning explored values in a grid search process including, e.g., 4, 6, 8, 10. In some embodiments, Min_child_weight includes a minimum sum of instance weight (hessian) needed in a child. If the tree partition step results in a leaf node with the sum of instance weight less than min_child_weight, then the building process ceases further partitioning. In a linear regression task, this simply corresponds to the minimum number of instances needed to be in each node. The larger min_child_weight is, the more conservative the algorithm will be. In some embodiments, tuning explored values in a grid search process including, e.g., 1, 3, 5. In some embodiments, Reg_lambda includes an L2 regularization term on weights. Increasing this value will make model more conservative. In some embodiments, tuning explored values in a grid search process including, e.g., 0.01, 0.1, 1.

Additionally, in some embodiments, the gradient boosted machine 352 employs early stopping. Therefore, in some embodiments, for any combination of the above hyper-parameters, the number of trees is increased up to a point where an increase in the number of trees fails to improve a cost function. This way, excessively increasing the number of trees is avoided to avoid overfitting. In some embodiments, the balance between accuracy, overfitting, and coverage can be expressed using measures of, e.g., mean precision, mean recall and mean coverage based on evaluation of a cost function employing cross-validation (e.g., five-fold cross validation) using the ground-truth input-output pairs. An example of hyper-parameters and the resulting performance is summarized in table 1 below:

TABLE 1

| Max depth | Min child weight | Reg Lambda | # trees | Mean f1 | Mean Precision | Mean recall | Mean coverage |
|---|---|---|---|---|---|---|---|
| 10 | 5 | 0.1 | 876 | 0.867 | 0.915 | 0.823 | 0.506 |
| 8 | 5 | 0.1 | 1000 | 0.867 | 0.920 | 0.820 | 0.504 |
| 8 | 1 | 1 | 689 | 0.864 | 0.915 | 0.818 | 0.503 |
| 4 | 1 | 1 | 1000 | 0.868 | 0.926 | 0.817 | 0.502 |
| 10 | 3 | 0.1 | 597 | 0.863 | 0.916 | 0.816 | 0.501 |

In some embodiments, maximum coverage may facilitate a greater number of predicted matches. Therefore, in some embodiments, the gradient boosted machine 352 is utilized with the row 1 hyper-parameters from Table 1; e.g., a max depth of 10, a min child weight of 5, a regularization lambda of 0.1 and a number of trees of 876.

In some embodiments, the gradient boosted machine 352 may then analyze the candidate pair features 334 to determine a score. In some embodiments, the gradient boosted machine 352 processes the features with weak classifiers. Once the features are analyzed by one node including a weak classifier, the result is then analyzed by the next node in a branch of the tree, and repeated until the end of the branch is reached. This process occurs for each branch, resulting in many scores based on the number of trees and the number of branches. All of the results are combined, e.g., summed, to produce a score for each of the candidate pairs 332. In some embodiments, the score is correlated to a probability. Therefore, the score and/or the probability of a match may be appended to the table with the candidate pairs 332 along with the candidate pair features 334.

In some embodiments, the table may be provided to the entity resolver 354. In some embodiments, the entity resolver may resolve activities against each data set individually: For each activity, the entity from the candidate entities of the second source records which has received the highest score by the gradient boosted machine 352 are each separately determined. If the maximum score is larger than a pre-specified threshold, a match for the associated activity is predicted. In some embodiments, the pre-specified threshold includes, e.g., a 50% probability of match, an 80% probability of match, a 90% probability of match, or other probability. A table of predicted matches between each activity and predicted matching entities associated with each activity is constructed and stored in, e.g., the memory 304.

In some embodiments, the entity resolver 354 may alternatively or additionally resolve activity data against all data sets in combination. For example, in some embodiments, the entity resolver 354 may use the scored results for all the candidate entities and find the candidate with maximum score for each activity. Therefore, every activity data has at most one match. A table of predicted matches between each activity and the one predicted matching entity associated with each activity is constructed and stored in, e.g., the memory 304.

Figure 4:
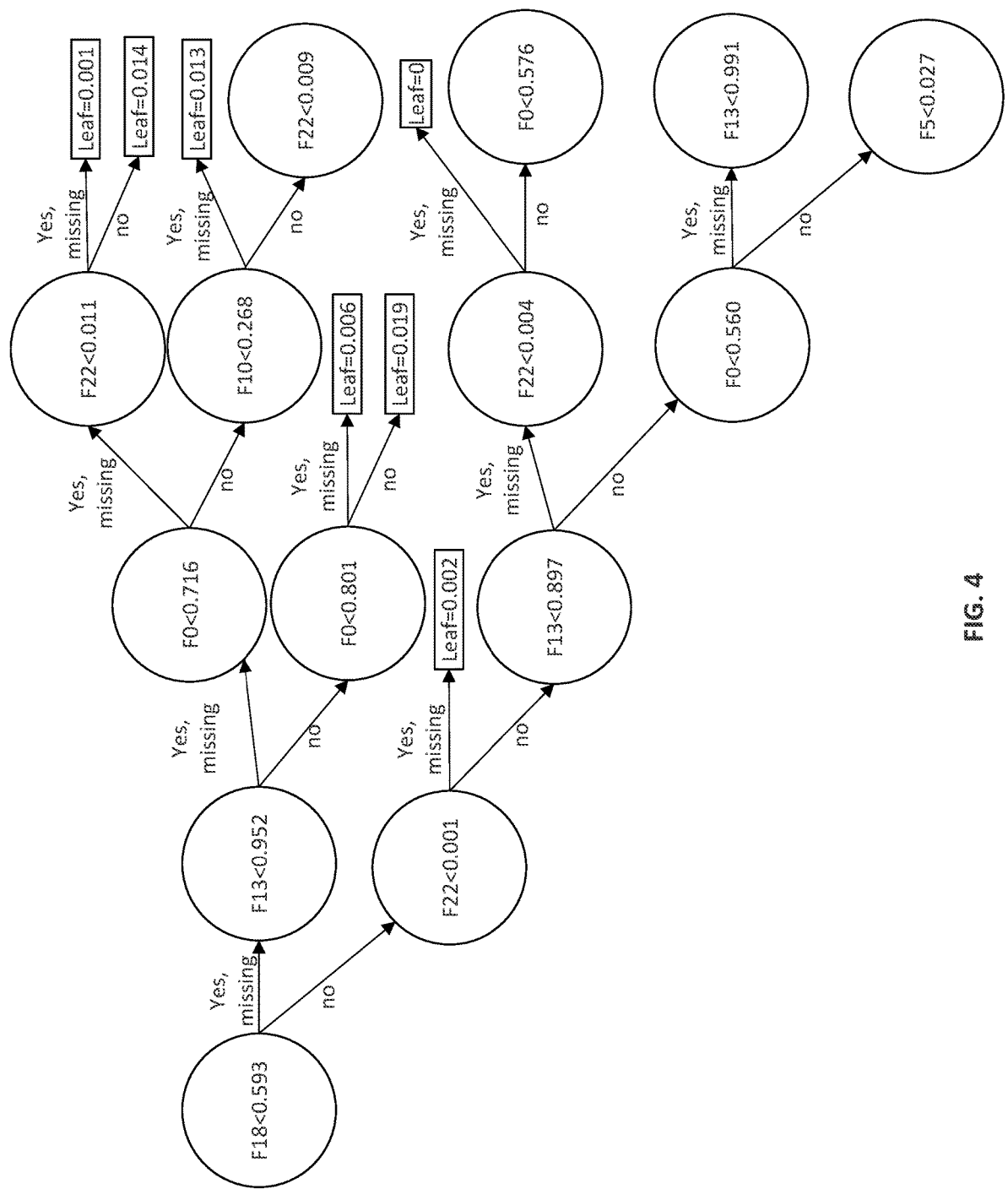

FIG. 4 is an illustration of an ensemble of trees of another exemplary computer-based system for entity resolution and activity aggregation and indexing in accordance with one or more embodiments of the present disclosure.

In some embodiments, an ensemble algorithm of classifiers, including a gradient boosted machine is employed to determine matches from the feature vectors described above. Gradient boosted machines are classified under the ensemble algorithms because the final decision is based on all of the decision trees that have been generated. Each tree is a weak classifier that predicts the residuals of the sum of the previous trees.

In some embodiments, the feature vectors are coded as numbers and the numbers on the leaves of the tree may be converted to probabilities for each class using the sigmoid function, e.g., $1/(1+\exp(x))$. The figure is a cropped version of the full tree and shows only a few branches of the tree to exemplify a gradient boosted machine of an exemplary entity engine.

In some embodiments, the gradient boosted machine utilizes, e.g., an Xgboost algorithm, however, other boosting algorithms are contemplated such as, e.g., AdaBoost. Thus, in some embodiments, the gradient boosted machine is trained by assigning an equal weight to each observation. Upon evaluation, weights of each observation are increased for the observations that difficult to classify, and lowered for the observations that are easy to classify (e.g., where the residuals are low and residuals are high, respectively). A subsequent tree is then appended with the new weights to improve on the predictions of the first tree. Trees are added for a specified number of iterations and the resulting prediction is the weighted sum of the predictions made by all previous trees.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Figure 5:
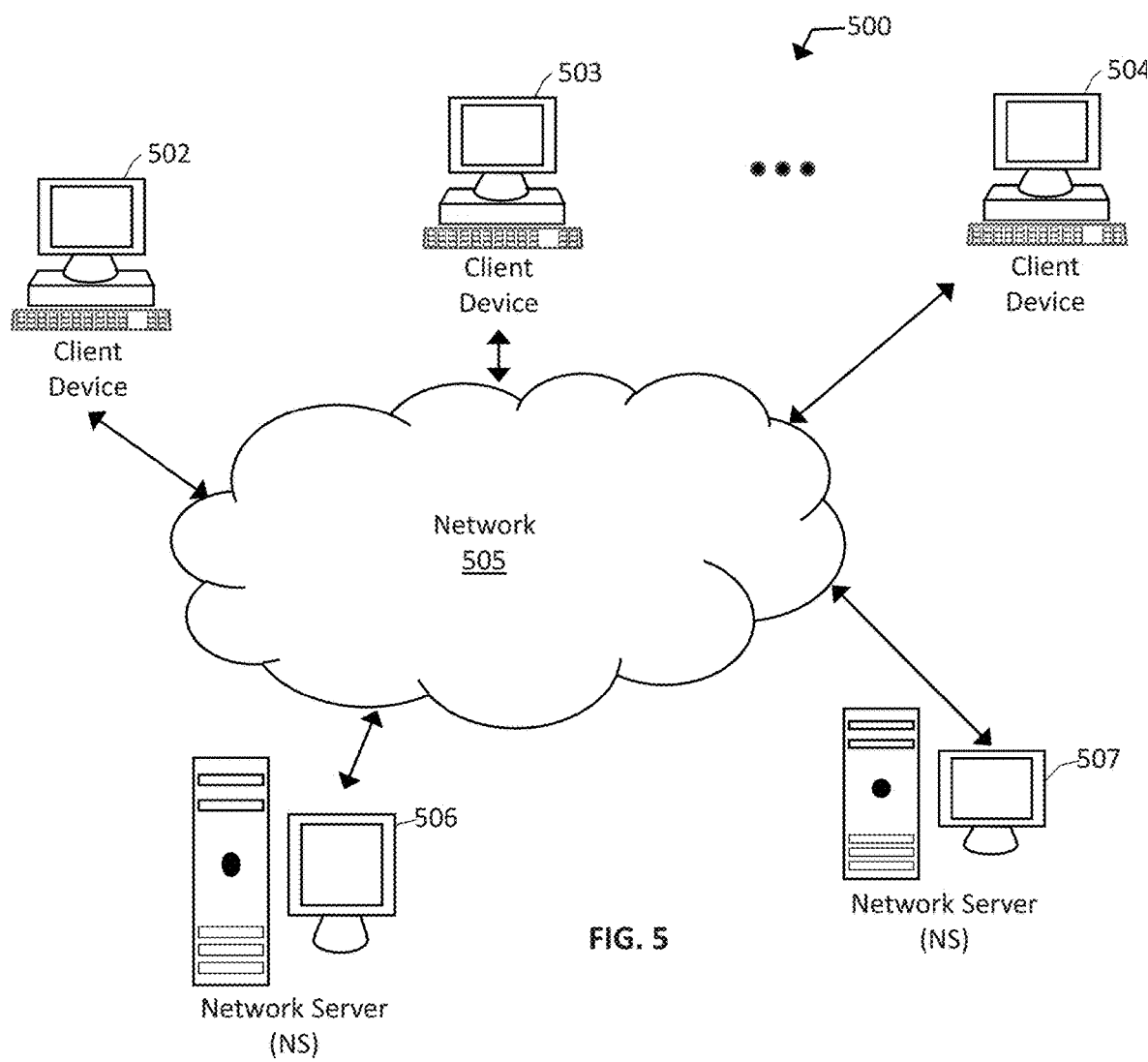

FIG. 5 depicts a block diagram of an exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 500 may be configured to manage a large number of members and/or concurrent transactions, as detailed herein. In some embodiments, the exemplary computer-based system/platform 500 may be based on a scalable computer and/or network architecture that incorporates varies strategies for assessing the data, caching, searching, and/or database connection pooling. An example of the scalable architecture is an architecture that is capable of operating multiple servers.

In some embodiments, referring for example to FIG. 5, members 502-504 (e.g., clients) of the exemplary computer-based system/platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-!04 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-!04.

In some embodiments and, optionally, in combination of any embodiment described above or below, for example, one or more exemplary computing member devices 502-!04, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
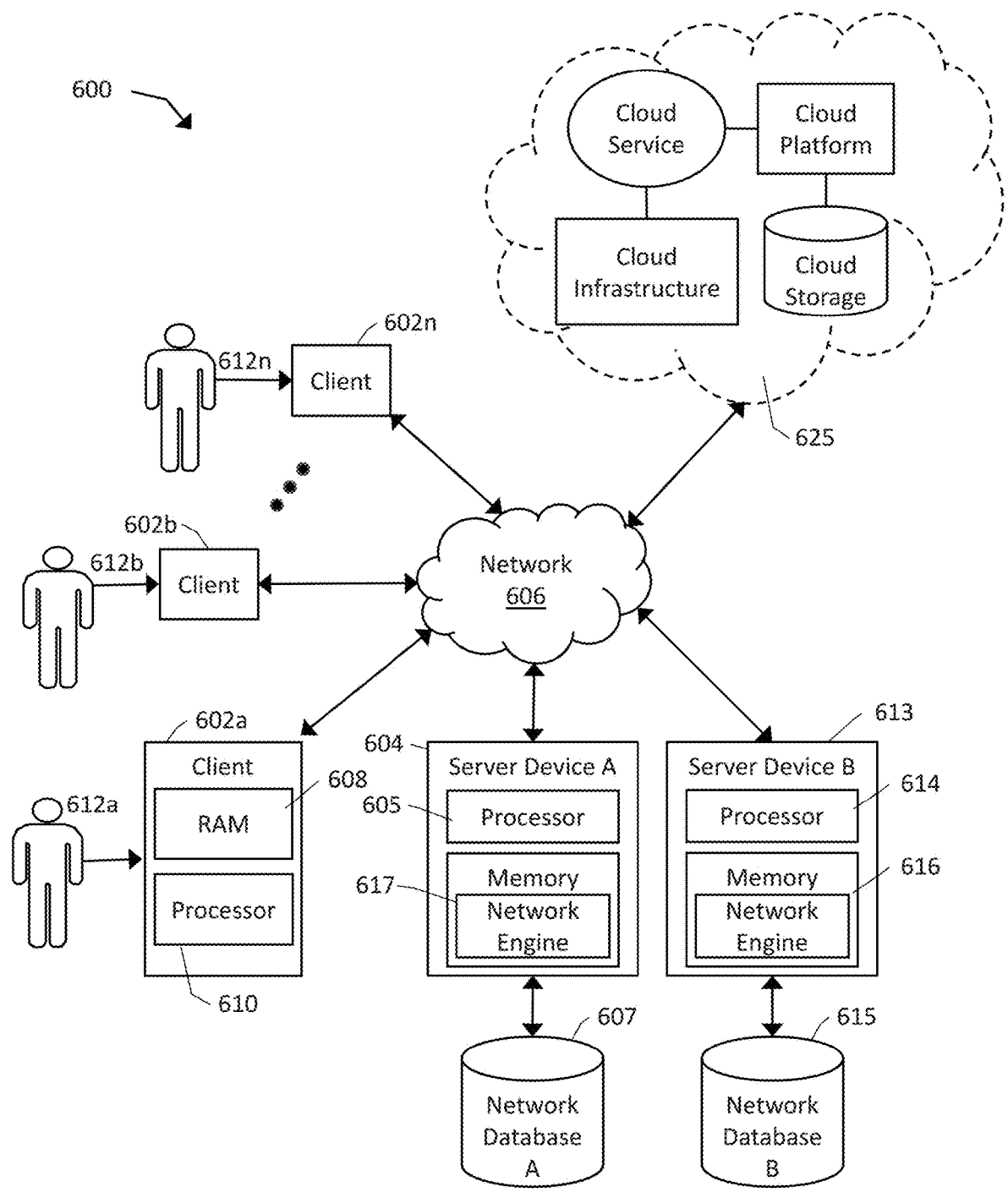

FIG. 6 depicts a block diagram of another exemplary computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602a, 602b thru 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™, Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, users, 612a through 602n, may communicate over the exemplary network 606 with each other and/or with other systems and/or devices coupled to the network 606. As shown in FIG. 6, exemplary server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
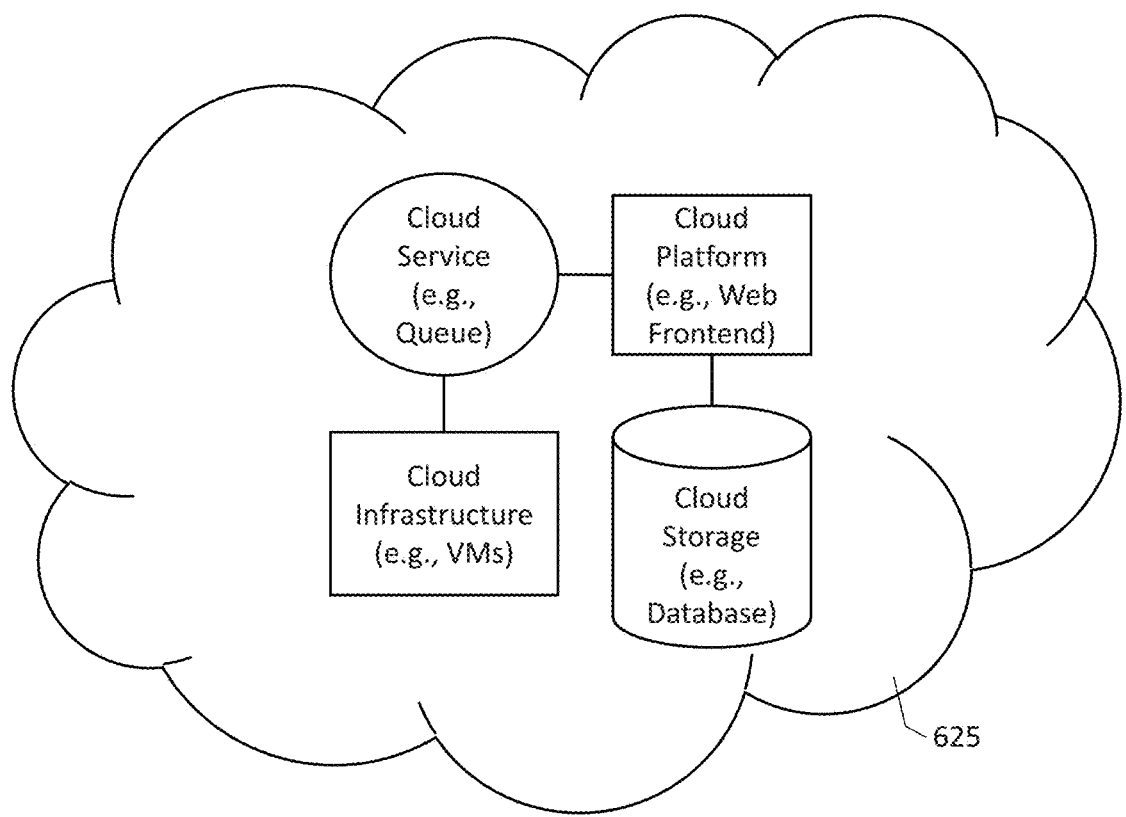
Figure 8:
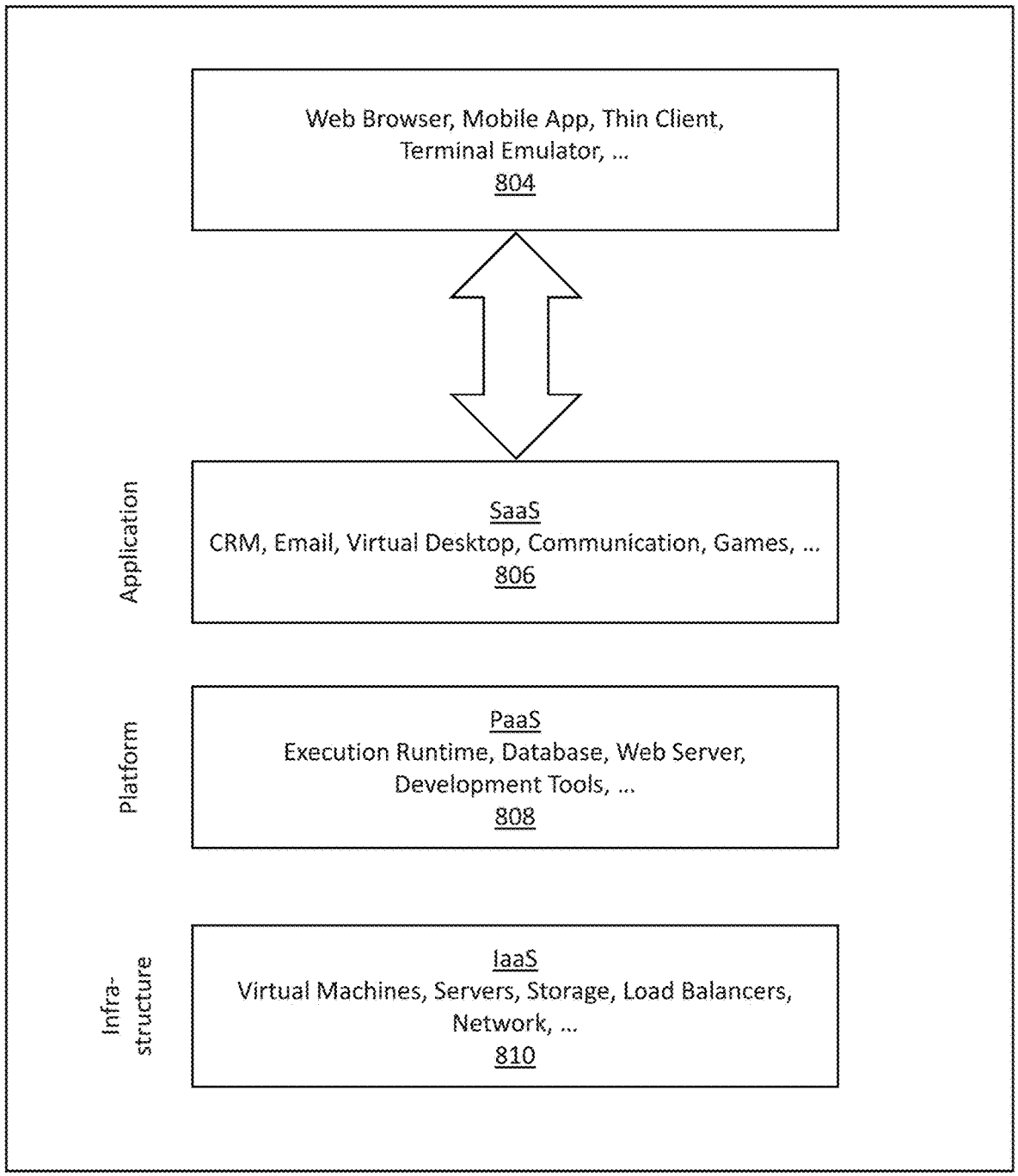

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

At least some aspects of the present disclosure will now be described with reference to the following numbered clauses.

1. A method comprising:
  receiving, by at least one processor, a plurality of first data items associated with a plurality of first source records in a first source database associated with a first entity from which a plurality of first source records originated;
    wherein each first data item of the plurality of first data items comprises:
      i) a quantity data item representing a quantity associated with a respective first data item,
      ii) a date data item representing a date associated with the respective first data item, and
      iii) a second entity data item identifying a second entity associated with the respective first data item;
  receiving, by the at least one processor, a set of a plurality of second data items from at least one second entity record database;
    wherein each second data item of the plurality of second data items in the set comprise a respective second entity record identifier data item representing a respective second entity record identifier associated with a respective second entity record;
  determining, by the at least one processor, a candidate set of second data items of the plurality of second data items by performing a heuristic search for candidate second data items in the set of second data items from the at least one second entity record database;
  generating, by the at least one processor, a respective first data entity feature vector associated with each respective first data item of the plurality of first data items based at least in part on the respective second entity data item associated with each respective first data item;
  generating, by the at least one processor, a respective second entity record feature vector associated with the respective second entity record identifier data item representing the respective second entity record identifier associated with each respective second entity record of each respective second data item of the candidate set of second data items based on the plurality of second entity record features for each respective candidate second data item second entity record;
  utilizing, by the at least one processor, an entity matching machine learning model to predict at least one matching first data item of the plurality of first data items to a respective candidate second data item in the candidate set of second data items based at least in part on the respective first data entity feature vector and the respective second entity record feature vector;
  determining, by the at least one processor, an aggregate quantity associated with the at least one matching first data item based at least on an aggregation of each respective quantity data item representing each respective quantity associated with each respective first data item of the at least one matching first data item;
  determining, by the at least one processor, a quantity index for each respective second entity record associated with each respective candidate second data item based at least in part on a respective aggregate quantity of an aggregate of each respective quantity data item associated with each respective first data item of the at least one matching first data item; and causing to display, by the at least one processor, the quantity index associated with a selected second entity record on a screen of at least one computing device associated with at least one user responsive to a selection by the at least one user of a selected second data item in the set of second data items.

2. The method of clause 1, wherein the aggregate quantity of each respective candidate second data item is updated based on new first data items in the plurality of first data items once every predetermined period.

3. The method of clause 2, wherein the predetermined period comprises a user selectable period according to a selection at the at least one computing device associated with the at least one user.

4. The method of clause 1, further comprising determining a second entity record risk for each respective second entity record associated with the set of second data items based at least on a respective quantity index.

5. The method of clause 1, wherein the candidate matching machine learning model comprises an ensemble of trees classifier.

6. The method of clause 6, wherein the ensemble of trees classifier comprises approximately 750 trees.

7. The method of clause 5, wherein the ensemble of trees classifier comprises a gradient boosted machine.

8. The method of clause 1, further comprising categorizing, by the at least one processor, each respective second entity record based on each respective associated quantity index according to a set of predetermined quantity index ranges to match each respective second entity associated with each respective second entity record to a product of a plurality of products;
wherein each predetermined quantity index range of the set of predetermined quantity index ranges matches to a respective product.

9. The method of clause 1, further comprising:
ranking, by the at least one processor, each respective second entity record based on each respective associated quantity index;
identifying, by the at least one processor, a set of highest performing second entities based on the ranking of each respective second entity record; and
generating, by the at least one processor, a target list of entities associated with the set of highest performing second entities to target for business communication.

10. The method of clause 1, further comprising:
ranking, by the at least one processor, each respective second entity record of a set of second entity records based on each respective associated quantity index;
wherein the set of second entity records are associated with a set of targeted second entities;
identifying, by the at least one processor, a set of highest performing second entities of the set of second entity records based on the ranking of each respective second entity record; and
generating, by the at least one processor, a priority list of entities associated with the set of highest performing second entities to target for business communication.

11. The method of clause 1, further comprising determining, by the at least one processor, approved second entity records associated with approved second entities based on a comparison between each respective quantity index associated with each respective second entity records and threshold quantity index.

12. The method of clause 1, further comprising:
categorizing, by the at least one processor, each respective second entity record of a set of second entity records into a respective customer category based on each respective quantity index associated with each respective second entity record of the set of second entity records according to a set of predetermined quantity index ranges;
wherein the set of second entity records comprise a set of customers; and
determining, by the at least one processor, modifications to one or more products associated with each respective second entity record of the set of second entity records based on each respective customer category.

13. A method comprising:
extracting, by the at least one processor, plurality of second entity record features associated with each respective candidate second data item in a candidate set of second data items;
wherein the plurality of second entity record features for each respective candidate second data item comprise a second entity record feature vector associated with the respective second entity record identifier data item representing the respective second entity record identifier associated with the respective second entity record;
wherein the candidate set of second data items results from a heuristic search for candidate second data items in a set of second data items from at least one second entity record database;
i) a plurality of respective second data items associated with a plurality of respective second entity records, and
ii) a plurality of respective second entity record identifier data items representing a plurality of respective second entity record identifiers associated with the plurality of respective second entity records;
receiving, by the at least one processor, a batch of a plurality of first data items associated with a plurality of first entity records in an account database associated with a first entity from which a plurality of first source records originated;
wherein each first data item of the batch of the plurality of first data items comprises:
i) a quantity data item representing a quantity associated with a respective first data item,
ii) a date data item representing a date associated with the respective first data item, and
iii) a second entity data item representing a second entity associated with the respective first data item;
wherein the batch comprises the plurality of first data items generated within a predetermined time period;
extracting, by the at least one processor, first data features from each first data item of the plurality of first data items;
wherein the first data features for each first data item comprise a respective first data second entity feature vector associated with each respective first data item of the plurality of first data items based at least in part on the respective second entity data item associated with each respective first data item;
utilizing, by the at least one processor, a second entity matching machine learning model to predict at least one matching first data item of the plurality of first data items to a respective candidate second data item in the candidate set of second data items based at least in part on the respective first data second entity feature vector and the respective second entity record feature vector;
determining, by the at least one processor, an aggregate quantity associated with the at least one matching first data item based at least on an aggregation of each respective quantity data item representing each respective quantity associated with each respective first data item of the at least one matching first data item;

determining, by the at least one processor, a quantity index for each respective second entity record associated with each respective candidate second data item based at least in part on a respective aggregate quantity of an aggregate of each respective quantity data item associated with each respective first data item of the at least one matching first data item; and causing to display, by the at least one processor, the quantity index associated with a selected second entity record on a screen of at least one computing device associated with at least one user responsive to a selection by the at least one user of a selected second data item in the set of second data items.

14. The method of clause 13, wherein the aggregate transfer amount of each respective candidate second data item is updated based on new first data items in the plurality of first data items.

15. The method of clause 13, wherein the predetermined period comprises a user selectable period according to a selection at the at least one computing device associated with the at least one user.

16. The method of clause 13, further comprising determining a second entity record risk for each respective second entity record associated with the set of second data items based at least on a respective quantity index.

17. The method of clause 13, wherein the candidate matching machine learning model comprises an ensemble of trees classifier.

18. The method of clause 17, wherein the ensemble of trees classifier comprises a gradient boosted machine having approximately 750 trees.

19. The method of clause 13, wherein each first data item of the plurality of first data items comprises a consumer credit card transfer to a second entity comprising a merchant account.

20. A system comprising:
an account database configured to store a plurality of first data items associated with a plurality of accounts;
at least one processor configured to perform instructions comprising:
  receive a plurality of first data items associated with a plurality of first entity records in an account database associated with a first entity from which a plurality of first source records originated;
    wherein each first data item of the plurality of first data items comprises:
      i) a quantity data item representing a quantity associated with a respective first data item,
      ii) a date data item representing a date associated with the respective first data item, and
      iii) a second entity data item representing a second entity associated with the respective first data item;
  receive a set of a plurality of second data items from at least one second entity record database;
    wherein each second data item of the plurality of second data items in the set comprise a respective second entity record identifier data item representing a respective second entity record identifier associated with a respective second entity record;
  determine a candidate set of second data items of the plurality of second data items by performing a heuristic search for candidate second data items in the set of second data items from the at least one second entity record database;
  generate a respective first data second entity feature vector associated with each respective first data item of the plurality of first data items based at least in part on the respective second entity data item associated with each respective first data item;
  generate a respective second entity record feature vector associated with the respective second entity record identifier data item representing the respective second entity record identifier associated with each respective second entity record of each respective second data item of the candidate set of second data items based on the plurality of second entity record features for each respective candidate second data item second entity record;
  utilize a second entity matching machine learning model to predict at least one matching first data item of the plurality of first data items to a respective candidate second data item in the candidate set of second data items based at least in part on the respective first data second entity feature vector and the respective second entity record feature vector;
  determine an aggregate quantity associated with the at least one matching first data item based at least on an aggregation of each respective quantity data item representing each respective quantity associated with each respective first data item of the at least one matching first data item;
  determine quantity index for each respective second entity record associated with each respective candidate second data item based at least in part on a respective aggregate quantity of an aggregate of each respective quantity data item associated with each respective first data item of the at least one matching first data item; and
  cause to display the quantity index associated with a selected second entity record on a screen of at least one computing device associated with at least one user responsive to a selection by the at least one user of a selected second data item in the set of second data items.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:
1. A method comprising:
receiving, by at least one processor, a user selection of an entity record in a set of a plurality of entity records in at least one entity record database;
  wherein the selected entity record comprises an entity identifier;
accessing, by the at least one processor, a plurality of activity data entries in an activity record database;
  wherein each activity data entry of the plurality of activity data entries comprises:
    i) a quantity data item representing a quantity associated with a respective activity data entry,
    ii) a date data item representing a date associated with the respective activity data entry, and iii) an entity data item identifying an entity associated with the respective activity data entry;

utilizing, by the at least one processor, an entity matching machine learning model to identify at least one matching activity data entry of the plurality of activity data entries matched to the entity record based at least in part on the respective entity data item of each respective activity data entry and the entity identifier of the entity record;

determining, by the at least one processor, a quantity index for the first entity record based at least in part on an aggregate quantity of each respective quantity data item associated with each respective at least one matching activity data entry; and causing to display, by the at least one processor, the quantity index associated with the entity record on a screen of at least one computing device associated with at least one user responsive to user selection.

2. The method of claim 1, wherein the quantity index of the entity record is updated based on new activity data entries in the plurality of activity data entries once every predetermined period.

3. The method of claim 2, wherein the predetermined period comprises a user selectable period according to a selection at the at least one computing device associated with the at least one user.

4. The method of claim 1, further comprising determining an entity record risk for the entity record based at least on the quantity index.

5. The method of claim 1, wherein the entity matching machine learning model comprises an ensemble of trees classifier.

6. The method of claim 5, wherein the ensemble of trees classifier comprises between 750 and 1,000 trees.

7. The method of claim 5, wherein the ensemble of trees classifier comprises a gradient boosted machine.

8. The method of claim 1, further comprising categorizing, by the at least one processor, the entity record based on the quantity index according to a set of predetermined quantity index ranges to match the entity record to a product of a plurality of products;
wherein each predetermined quantity index range of the set of predetermined quantity index ranges matches to a respective product.

9. The method of claim 1, further comprising:
ranking, by the at least one processor, the entity record in a plurality of additional entity records based on a respective a quantity index of each additional entity record in the plurality of additional entity records;
identifying, by the at least one processor, a set of highest performing entities based on the ranking of the entity record and the plurality of additional entity records; and
determining, by the at least one processor, whether the entity record is in the set of highest performing entities to target for business communication.

10. The method of claim 1, further comprising:
ranking, by the at least one processor, the entity record in a set of targeted entity records based on a respective a quantity index of each additional entity record in the plurality of additional entity records;
identifying, by the at least one processor, a set of highest performing entities based on the ranking of the entity record and the plurality of additional entity records; and
determining, by the at least one processor, whether the entity record is in a set of highest performing first entities to target for business communication set of highest performing first entities to target for business communication.

set of highest performing first entities to target for business communication.

11. The method of claim 1, further comprising determining, by the at least one processor, an approved status of the entity record based on a comparison between the quantity index and a threshold quantity index.

12. The method of claim 1, further comprising:
categorizing, by the at least one processor, the entity record into a customer category based on the quantity index according to a set of predetermined quantity index ranges; and
determining, by the at least one processor, modifications to one or more products associated with the entity record based on the customer category.

13. A method comprising: extracting, by at least one processor, a plurality of entity record features associated with each respective candidate entity record in a candidate set of entity records; wherein the plurality of entity record features for each respective candidate entity record comprise an entity feature vector associated with a respective entity identifier; receiving, by at least one processor, a batch of a plurality of activity data entries in an activity record database; wherein each activity data entry of the batch of the plurality of activity data entries comprises: i) a quantity data item representing a quantity associated with a respective activity data entry, ii) a date data item representing a date associated with the respective activity data entry, and iii) an entity data item representing an entity associated with the respective activity data entry; utilizing, by the at least one processor, an entity matching machine learning model to identify a respective at least one matching activity data entry of the plurality of activity data entries to each respective candidate entity record in the plurality of candidate entity records based at least in part on the respective entity data item and the entity record feature associated with each respective candidate entity record; determining, by the at least one processor, a quantity index for each respective candidate entity record based at least in part on a respective aggregate quantity of an aggregate of each respective quantity data item associated with each respective activity data entry of the respective at least one matching activity data entry; and causing to display, by the at least one processor, the quantity index associated with a selected entity record on a screen of at least one computing device responsive to a at least one user selection of a selected candidate entity record of the candidate set of entity records.

14. The method of claim 13, wherein the aggregate transfer amount of each respective candidate entity record is updated based on new activity data entries in the plurality of activity data entries.

15. The method of claim 13, wherein the predetermined period comprises a user selectable period according to a selection at the at least one computing device associated with the at least one user.

16. The method of claim 13, further comprising determining an entity record risk for the entity record based at least on a respective quantity index.

17. The method of claim 13, wherein the entity matching machine learning model comprises an ensemble of trees classifier.

18. The method of claim 17, wherein the ensemble of trees classifier comprises a gradient boosted machine having between 750 and 1,000 trees.

19. The method of claim 13, wherein each activity data entry of the plurality of plurality of activity data entries comprises a consumer credit card transfer to a merchant entity comprising a merchant account.

20. A system comprising:
   an activity record database configured to store a plurality of activity data entries associated with a plurality of accounts;
   at least one processor configured to perform instructions comprising:
      receive a plurality of activity data entries in the activity record database;
         wherein each activity data entry of the plurality of activity data entries comprises:
            i) a quantity data item representing a quantity associated with a respective first data item,
            ii) a date data item representing a date associated with the respective first data item, and
            iii) an entity data item identifying an entity associated with the respective activity data entry;
      receive a user selection of an entity record in a set of a plurality of entity records in at least one entity record database;
         wherein the entity record comprises an entity identifier;
      utilize an entity matching machine learning model to identify at least one matching activity data entry of the plurality of activity data entries to the entity record based at least in part on the respective entity data item of each respective activity data entry and the respective entity record;
      determine a quantity index for the entity record based at least in part on an aggregate quantity of an aggregate of each respective quantity data item associated with each respective activity data entry of the at least one matching activity data entry; and
      cause to display the quantity index associated with the entity record on a screen of at least one computing device associated with at least one user responsive to the user selection.

* * * * *